US006757869B1

(12) United States Patent
Li et al.

(10) Patent No.: US 6,757,869 B1
(45) Date of Patent: Jun. 29, 2004

(54) METHOD AND APPARATUS FOR PROVIDING ACCESS TO A LEGACY APPLICATION ON A DISTRIBUTED DATA PROCESSING SYSTEM

(75) Inventors: Yongcheng Li, Raleigh, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/527,901

(22) Filed: Mar. 20, 2000

(51) Int. Cl.[7] .............................................. G06F 15/16
(52) U.S. Cl. ..................... 715/513; 715/523; 709/203
(58) Field of Search ............................. 715/513, 523, 715/522, 524, 530; 709/246, 203

(56) References Cited

U.S. PATENT DOCUMENTS

| | | | | |
|---|---|---|---|---|
| 6,012,098 A | * | 1/2000 | Bayeh et al. | 709/246 |
| 6,446,110 B1 | * | 9/2002 | Lection et al. | 709/203 |
| 6,535,896 B2 | * | 3/2003 | Britton et al. | 715/523 |
| 6,585,778 B1 | * | 7/2003 | Hind et al. | 715/513 |

FOREIGN PATENT DOCUMENTS

| | | | |
|---|---|---|---|
| EP | 1122652 | 8/2001 | G06F/17/30 |
| GB | 2359645 | 8/2001 | G06F/17/30 |
| WO | WO01/57652 | 8/2001 | G06F/9/44 |

OTHER PUBLICATIONS

IEEE 8th International Workshops on Enabling Technologies: Infrastructure for Collaborative Enterprises 1999 (WET ICE '99) Proceedings. Moshfeghi et al, "XML in a Multi–Tier Java/Corba Architecture", pp. 343–349.

Computers in Cardiology, published Sep. 26–29, 1999, Pons et al, "Medical Database Migration Using New XML Internet Standard", pp. 93–96.

"Application Connector Markup Language (ACML)—Electran's Connection to the Back–Office System", http://www.electran.com/Electran White Paper.html pp 1–6.

* cited by examiner

Primary Examiner—Sanjiv Shah
(74) Attorney, Agent, or Firm—Duke W. Yee; Jerry W. Herndon; Francis Lammes (57) ABSTRACT

A method and apparatus for accessing an application is provided. Data from a host application is transformed from a host format to a markup language format to form markup language data. A stylesheet is applied to the markup language data to generate a markup language document. This markup language document is then presented on a display on which user interaction may occur. In response to receiving input to the markup language document, this input is transformed into the host format and returned to the host application. In this manner, access to a legacy application is provided.

31 Claims, 8 Drawing Sheets

METHOD AND APPARATUS FOR PROVIDING ACCESS TO A LEGACY APPLICATION ON A DISTRIBUTED DATA PROCESSING SYSTEM

BACKGROUND OF THE INVENTION

1. Technical Field

The present invention provides and improved data processing system and in particular a method and apparatus for accessing applications. Still more particularly, the present invention provides a method and apparatus for accessing legacy applications in a distributed data processing system through a display emulation mechanism.

2. Description of Related Art

The Internet, also referred to as an "internetwork", is a set of computer networks, possibly dissimilar, joined together by means of gateways that handle data transfer and the conversion of messages from the sending network to the protocols used by the receiving (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonalty employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to provide users access to applications through browsers. Access to applications on the Web is commonly provided through the use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Numerous legacy applications, however, still exist, which cannot be easily accessed across the Web. A legacy application is an application that has been in existence for some time. The term often refers to mainframe and enterprise resource planning (ERP) applications. In today's world of the Internet, virtually anything not Web related is often thought of as a legacy application. These applications are still used by many businesses and provide access business data, such as financial information, customer lists, personnel records, and manufacturing reports. Many businesses desire to provide access to these applications for use by employees and customers across the Web.

The use of mainframe systems as a Web server to provide access to applications is becoming more common. The legacy applications on these types of systems, however, provide user interaction through a "green screen". A "green screen" is a display using green characters on a dark background. Access to these applications has been provided through the use of a terminal emulation, which requires the installation of emulator software or downloading of an applet on the client. In other cases, HTML versions of "green screen" have been created for transmission to browsers in clients. An HTML document is created for each screen in an application. Creation of HTML versions of these screens however, is tedious and time consuming.

Therefore, it would be advantageous to have an improved method and apparatus for providing access to legacy application over the Web.

SUMMARY OF THE INVENTION

The present invention provides a method and apparatus for accessing an application. Data from a host application is transformed from a host format to a markup language format to form markup language data. A stylesheet is applied to the markup language data to generate a markup language document. This markup language document is then presented on a display on which user interaction may occur. Multiple stylesheets can be used to provide different displays for the same host application data.

In response to receiving input to the markup language document, this input is transformed into the host format and returned to the host application. In this manner, the mechanism of the present invention provides access to a legacy application.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DESCRIPTION OF THE PREFERRED EMBODIMENT

Figure 1:
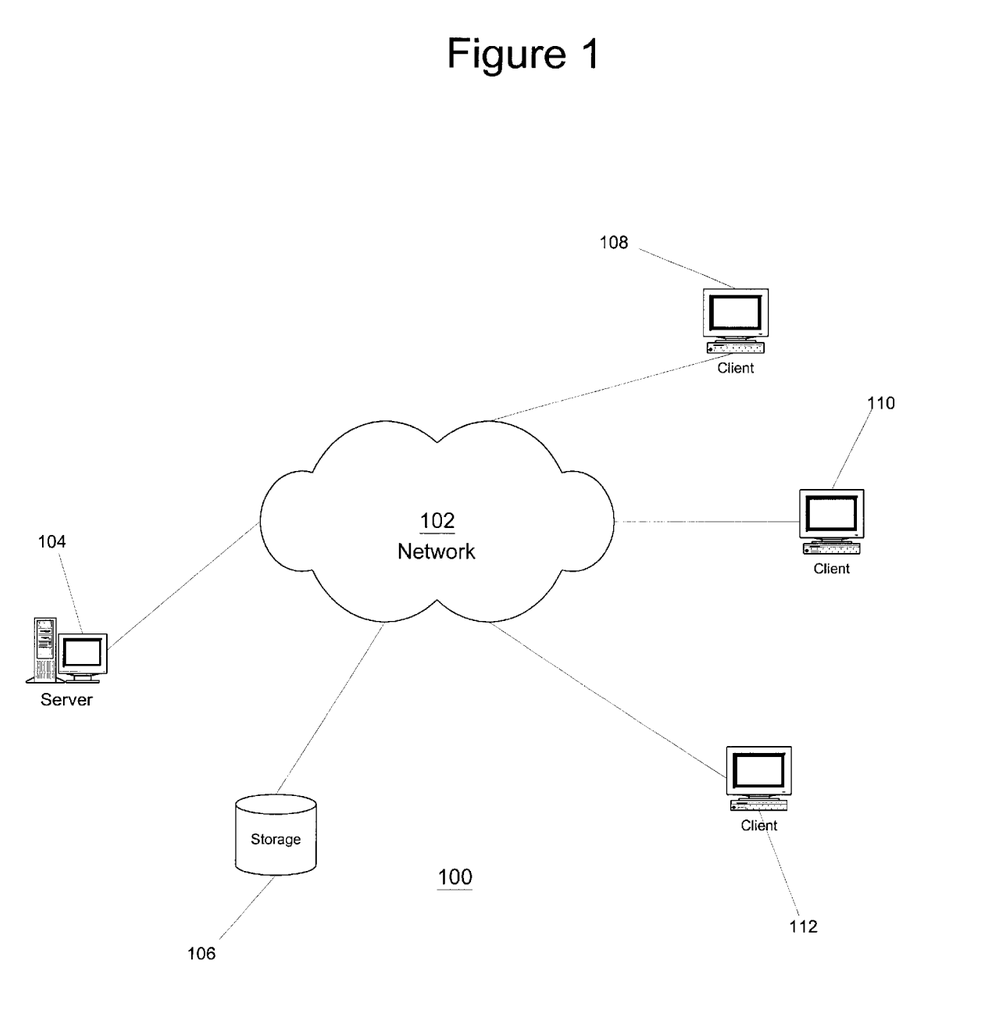
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

A legacy application may be located on server 104. In this example, the legacy application is a host application, which provides a "green screen" or other display to clients 108–112. Access to this legacy application by clients, such as clients 108–112 is provided with or without requiring installation of emulating software or downloading an applet version of the emulator over network 102.

The mechanism of the present invention generates HTML pages based on the use of extensible markup language (XML) and extensible stylesheet language (XSL) in these examples. Specifically, a host datastream is converted into XML format. This host datastream contains a display for user input. An XSL stylesheet is applied to this converted data to generate an HTML page in this example. The HTML page is sent to a browser for display and a client, such as client 108. The HTML page is sent to client 108 over a connection using Hypertext Transfer Protocol (HTTP). Input may be received by server 104 in response to user interaction with the HTML page displayed at client 108. This input is in a HTTP format. The input is converted or transformed into a format recognized by the legacy application with the transformed input being sent to the legacy application.

Figure 2:
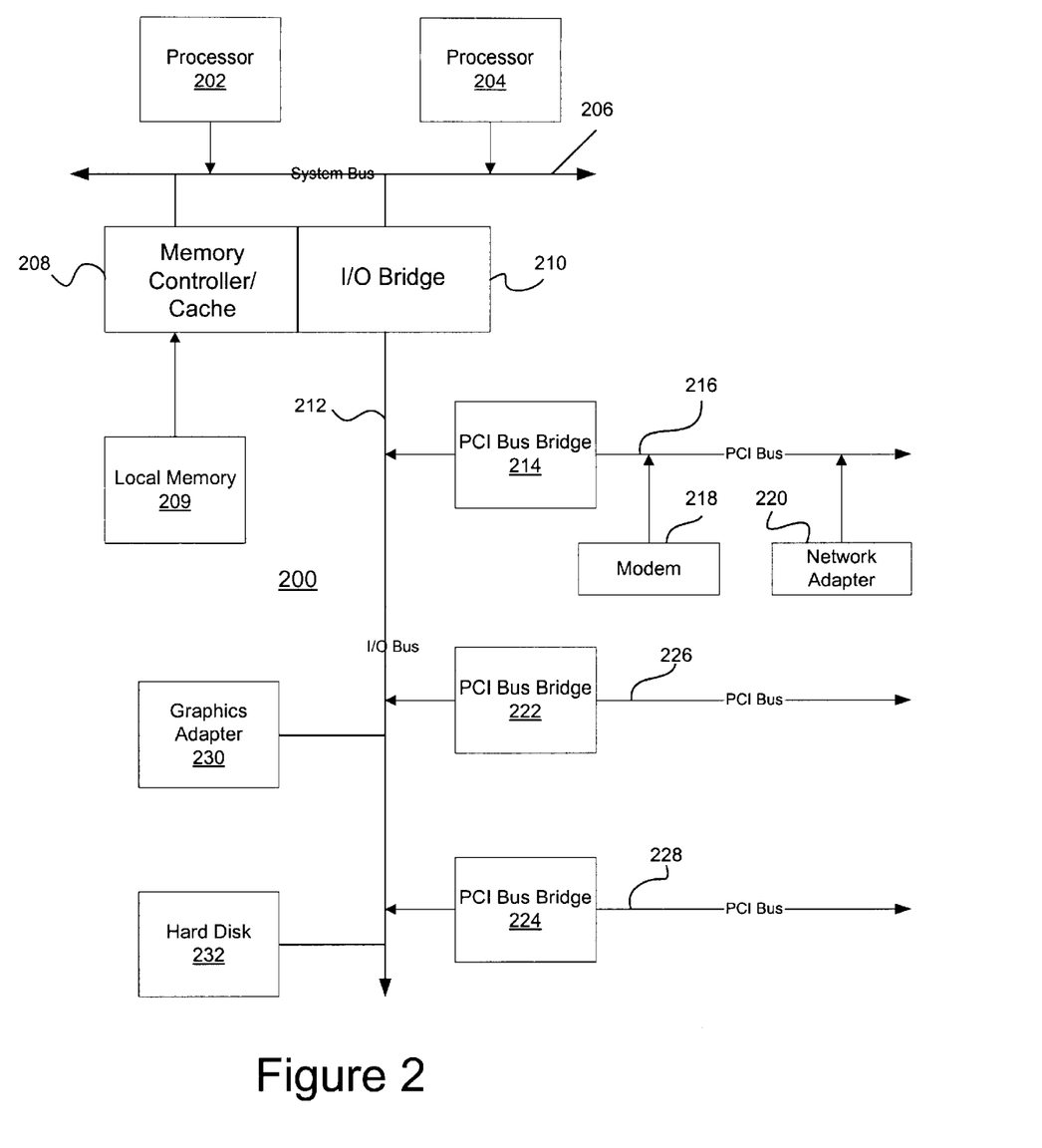
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Data processing system 200, in these examples, contains the processes used to convert the data between a host or legacy format and a markup language format, such as extensible markup language (XML). The processes used to apply a stylesheet to the converted data in XML also may be located within data processing system 200.

Figure 3:
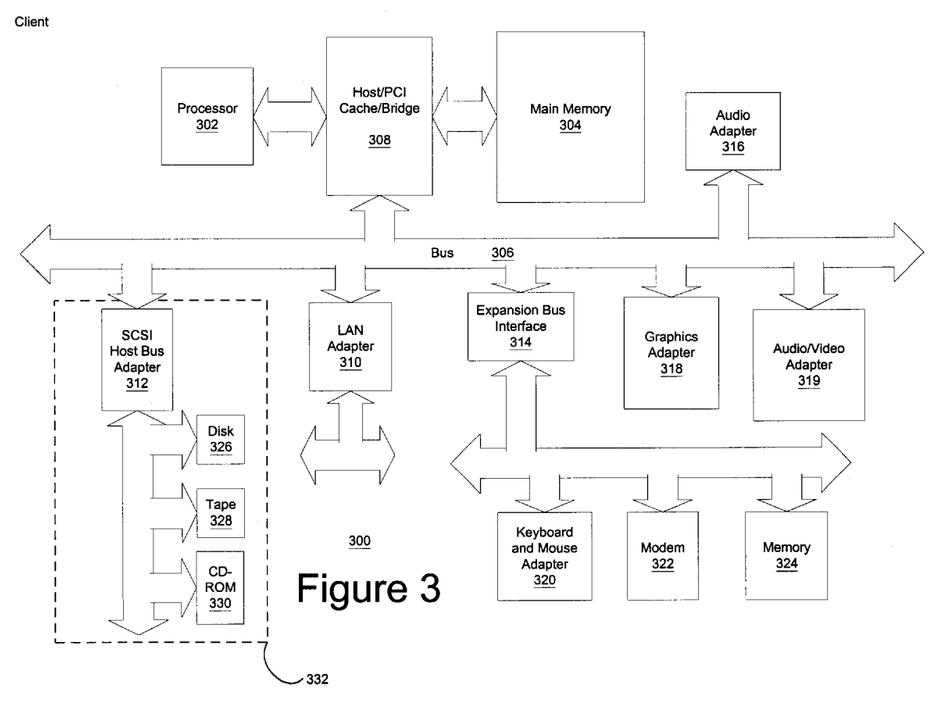
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
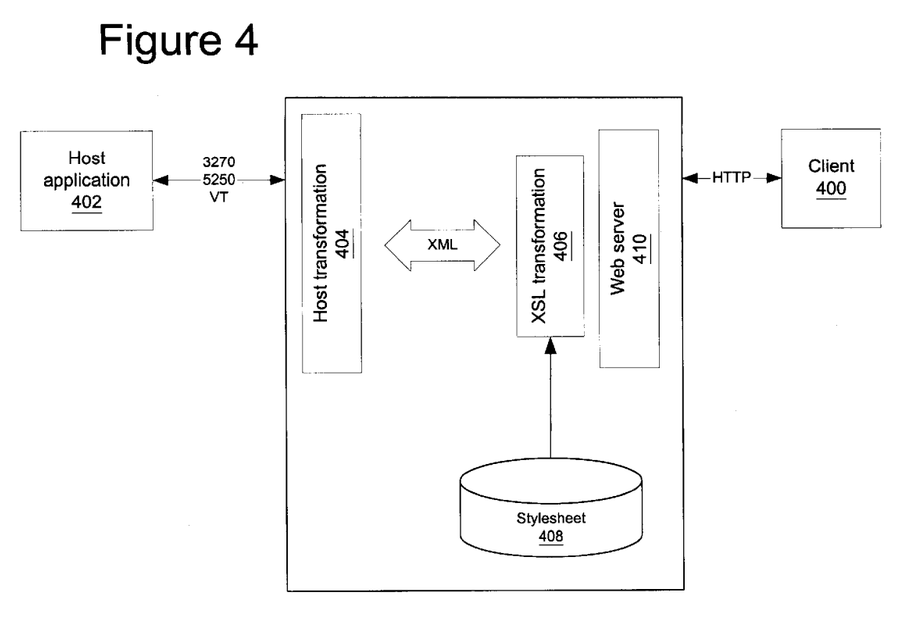
FIG. 4 is a block diagram of components used to provide display emulation for a legacy application in accordance with a preferred embodiment of the present invention.

With reference now to FIG. 4, a block diagram of components used to provide display emulation for a legacy application is depicted in accordance with a preferred embodiment of the present invention. In this example, a client 400 accesses a host application 402. This access is provided through the use of host transformation 404, XSL transformation 406, stylesheet 408, and web server 410.

Host application 402 sends host data to host transformation 404. In this example, the data contains a host screen. Host transformation 404 converts the host screen from a host format into a markup language format, such as, for example, an XML format to form XML data. XML is an open standard for describing data.

The host format may take various forms, such as, for example, 3270, 5250, and VT, which are host application data formats sent by systems, such as International Business Machine Corporation's S/390 and AS/400 host's to terminal devices. XML is used for defining data elements on a Web page and business-to-business documents. XML uses a similar tag structure as HTML. HTML defines how elements are displayed, while XML defines what those elements contain. HTML uses predefined tags, but XML allows tags to be defined by the developer of the page. As a result, virtually any data items, such as product, sales rep and amount due, can be identified, allowing Web pages to function like database records. Thus, XML provides a common method for identifying data. In this example, the transformation of the host data into XML format is performed using Document type definition (DTD). DTD is a language that describes the contents of an standard generalized markup language (SGML) document. The DTD is also used with XML, and the DTD definitions may be embedded within an XML document or in a separate file.

XSL transformation 406 will apply an XSL stylesheet 408 to the XML data to generate an HTML page. In this example, XSL transformation 406 may take the form of a Java servlet. The HTML page generated by XSL transformation 406 is passed to web server 410, which in turn sends the HTML page to client 400 for display in a browser. This HTML page provides a similar interface as the one generated by host application 402. When XML data is transformed into HTML format, information about host screen input fields are inserted into HTML input fields so that user input to the HTML page can be recognized and transformed back into the corresponding host screen fields. The stylesheet defines a template structure to the HTML form in these examples. Of course, the stylesheet may be used to generate document formats other than HTML depending on the implementation. Additionally, Java script may be used in cases in which stylesheet syntax does not allow a text element to be easily broken down according to a line boundary. In these examples, Java script may be combined with the XML transformation to render the host screen in HTML by using Java script to calculate the position of host fields.

User input to the HTML page is collected and sent back to web server 410 in HTML format. This user input is then returned to host transformation 404, which transforms the data into a host format for host application 402. The transformed data is then returned to host application 402.

Through the use of stylesheets, the mechanism of the present invention provides reusable software components, which reduces the work or effort required to provide emulation of displays or screens for a legacy application, such a host application 402.

The division of the functions between the various components in FIG. 4 is made to facilitate an explanation of the present invention and is not intended as an architectural limitation to the present invention. For example, host transformation 404, XSL transformation 406, and web server 410 may be combined into a single application. The components may be implemented in a server, such as data processing system 200 in FIG. 2. Alternatively, host transformation 404 and XSL transformation 406 may be combined into one application on a web server. Further, host application 402 may be located on the same data processing system as host transformation 404, XSL transformation 406, and web server 410. Alternatively, host application 402 may be located on a remote data processing system, such as a mainframe computer.

Figure 5:
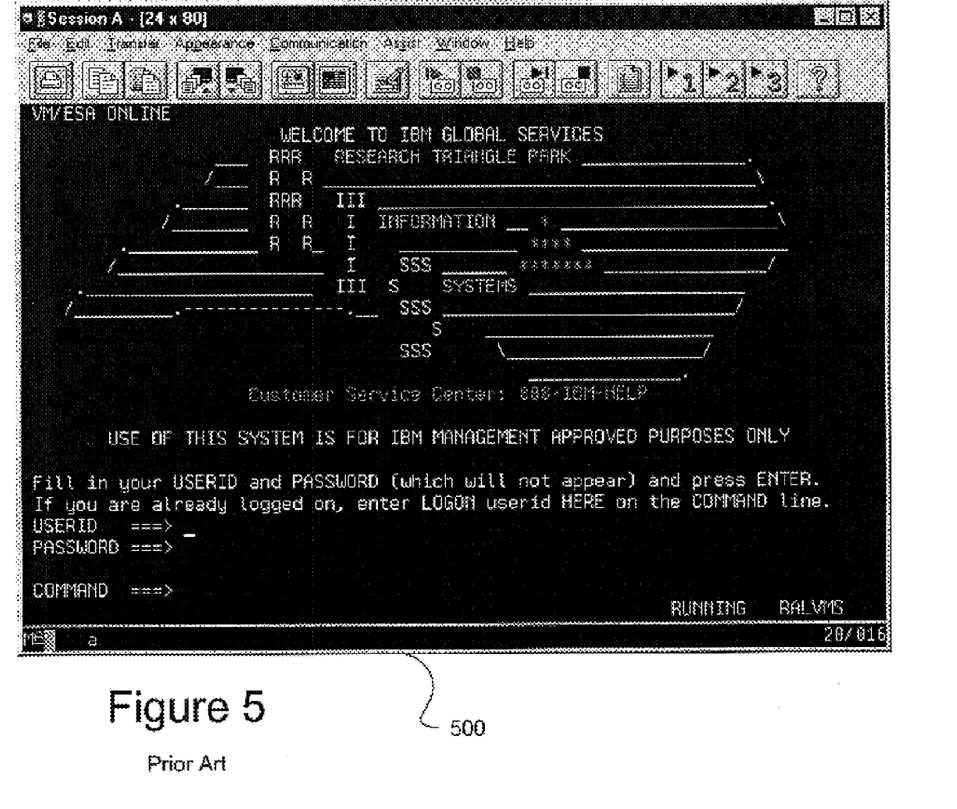
FIG. 5 is a diagram of a legacy display.

With reference now to FIG. 5 a diagram of a legacy display is depicted. Display 500 illustrates a "green screen" display of the type often provided by a legacy application, such as those found on mainframe computers. As can be seen in display 500, the display is in a text format instead of a graphical format.

Figure 6:
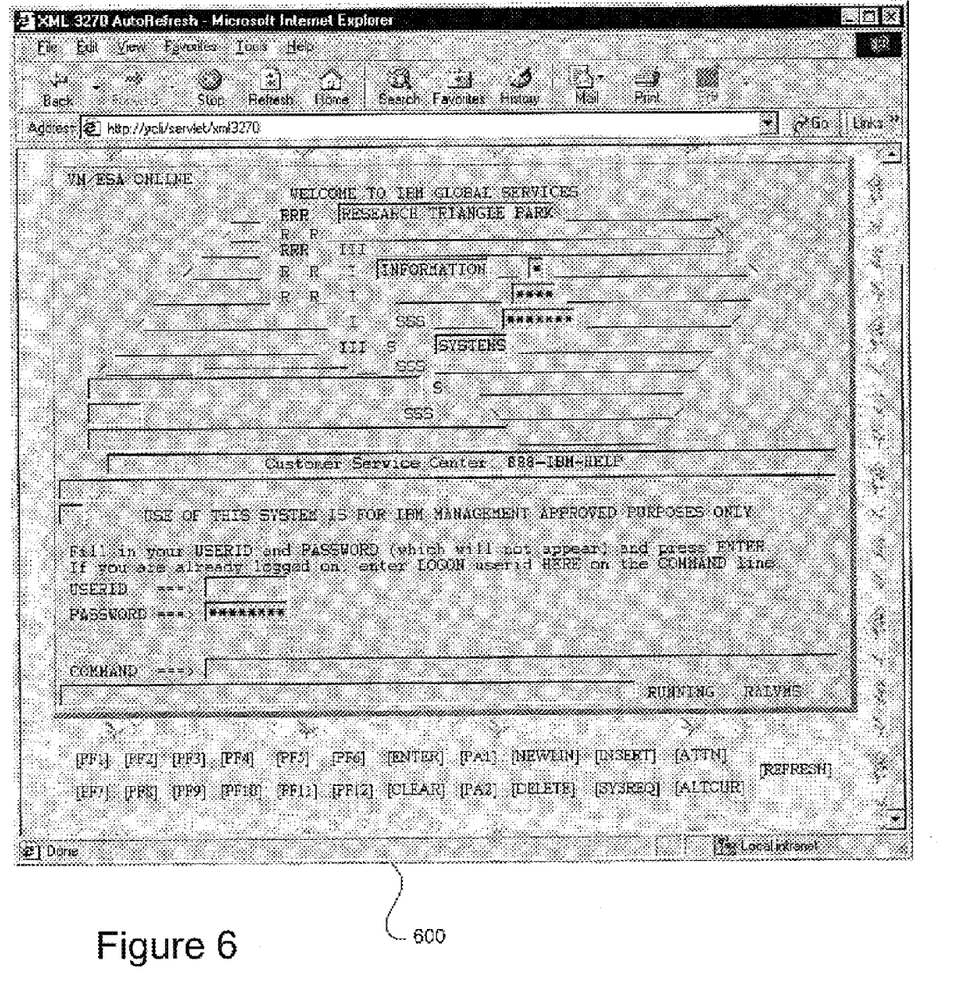
FIG. 6 is a display of a converted screen in accordance with a preferred embodiment of the present invention.

Turning next to FIG. 6, a display of a converted screen is depicted in accordance with a preferred embodiment of the present invention. In this example, display 600 illustrates a HTML document displayed to emulate a legacy display, such a display 500 in FIG. 5. In this example, a stylesheet, such as a XSL stylesheet is applied to XML data created through a transformation of the host data for display 500.

Figure 7:
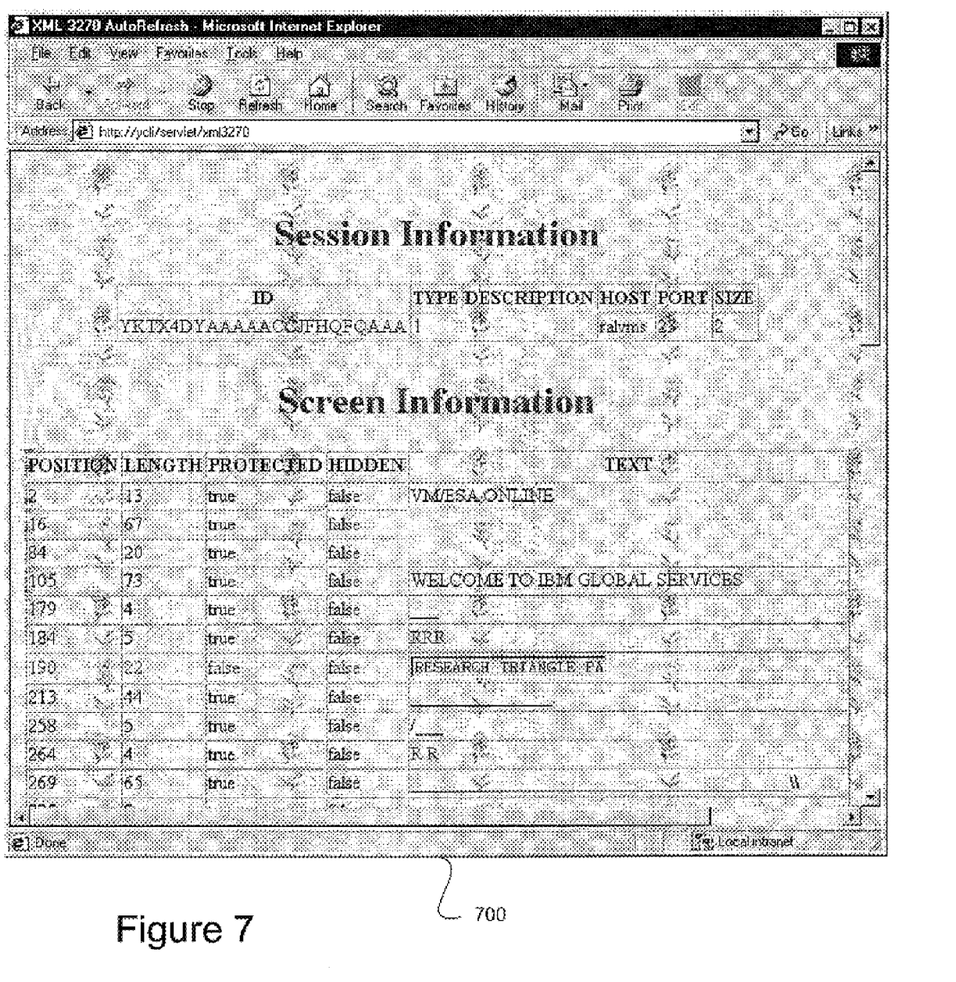
FIG. 7 is a display of an alternative converted screen in accordance with a preferred embodiment of the present invention.

Turning to FIG. 7, a display of an alternative converted screen is depicted in accordance with a preferred embodiment of the present invention. Display 700 is a display of an HTML document. Display 700 is an example of another format of a screen created from host data. In this example, display 700 is created through converting host data for display 500 in FIG. 5. Display 700 is one that is more likely to be used by a user performing debugging operations. Display 700 is created through application of a different stylesheet from that used to generate display 600 in FIG. 6. The stylesheet is applied to the same XML data.

Thus, a number of different formats may be created from a single host display. These different formats are generated through an application of different stylesheets to the XML data generated by transformation of the host data into an XML format. In this manner, different clients may receive different displays from the same host application, depending on the stylesheet applied.

Figure 8:
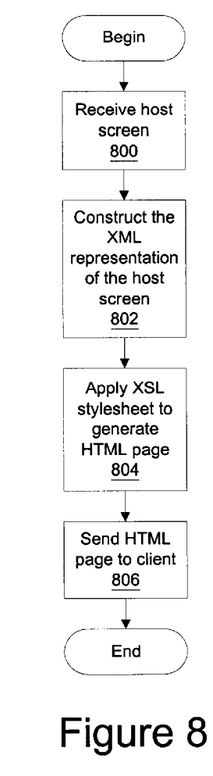
FIG. 8 is a flowchart of a process for generating a display from host data in accordance with a preferred embodiment of the present invention.

With reference now to FIG. 8, a flowchart of a process for generating a display from host data is depicted in accordance with a preferred embodiment of the present invention. The process begins by receiving a host screen (step 800). An XML representation of the host screen is constructed (step 802). This step is implemented in a host transformation unit, such as host transformation 404 in FIG. 4. In this example, the process may be implemented using a Java bean. The process used in constructing the representation of the host screen involves transforming the data from a host format into an XML format.

Next, an XSL stylesheet is applied to the XML representation to generate an HTML page (step 804). This step is performed by an XSL transformation unit, such as XSL transformation 406 in FIG. 4. The stylesheet defines a template structure for the HTML form. XML data content is dynamically associated with locations on the resulting HTML page along the same column and row positions of the original "green screen". A Javascript may be used to overcome the shortcomings of the current XSL stylesheet syntax which does not allow a text element to be broken down according to line boundary easily.

In step 804, unprotected fields are automatically converted into form input elements of the TEXT type, and non-displayable fields become the PASSWORD type. User's function key selection is set to a HIDDEN type input element such that its value can be recognized and transformed back into corresponding host screen function key. The terminal screen cursor position is also set to a HIDDEN type input for the same purpose. In addition, the stylesheet name also is set to a HIDDEN type input such that an administrator can manipulate the selection of stylesheets dynamically as screen flows. This manipulation may be accomplished by setting up the desired stylesheet name for the next screen in the current stylesheet. The form specifies the returning place to the servlet on the server which does the XML/XSL processing iteratively. The form template is embedded in the stylesheet, which is processed by an XSL transformation process to generate the final form for interaction with users. The HTML page is then sent to the client for display (step 806) with the process terminating thereafter. This step may be performed by a web server application, such as web server 410 in FIG. 4.

Figure 9:
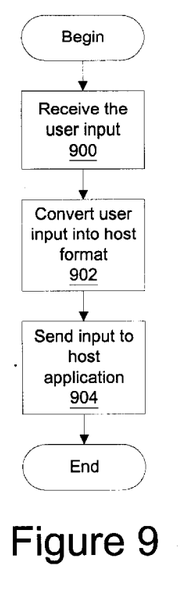
FIG. 9 is a flowchart of a process for returning user input to a host application in accordance with a preferred embodiment of the present invention.

With reference next to FIG. 9, a flowchart of a process for returning user input to a host application is depicted in accordance with a preferred embodiment of the present invention. The process begins by receiving user input to an HTML page (step 900). This input is received from user input applied to a browser. The input is received at a servlet or computer graphics interface (CGI). A servlet is a Java application that runs in a Web server or application server and provides server-side processing, typically to access a database or perform e-commerce processing. CGI is a device independent graphics language for display and printing. The servlet or CGI may be implemented in web server 410 in FIG. 4.

The user input is then converted into a host format (step 902). The user input is then sent to the host application (step 904) with the process terminating thereafter.

Figure 10:
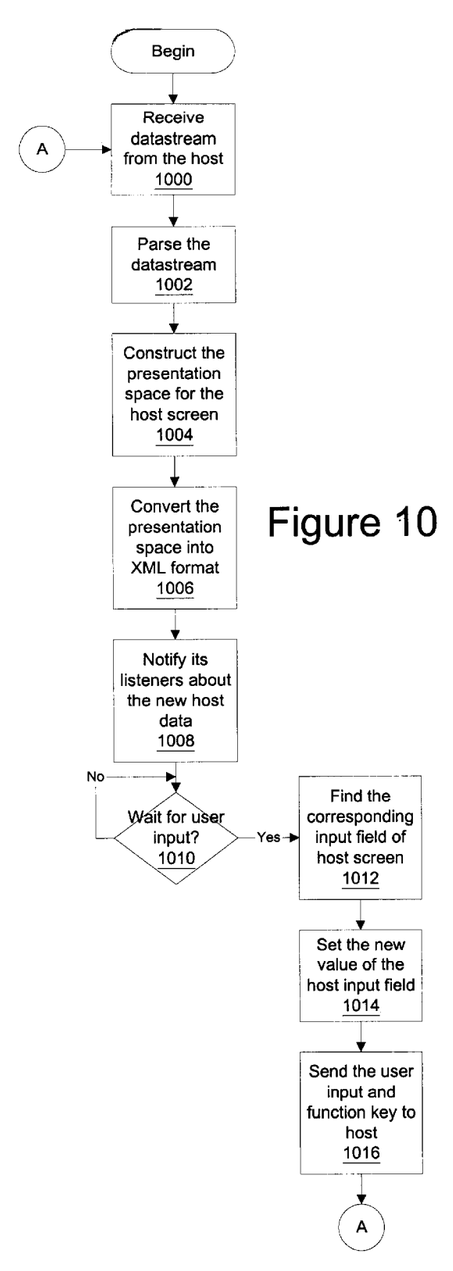
FIG. 10 is a flowchart of a process for converting a datastream between a host format and an XML format in accordance with a preferred embodiment of the present invention.

Turning now to FIG. 10, a flowchart of a process for converting a datastream between a host format and an XML format is depicted in accordance with a preferred embodiment of the present invention. The processes illustrated in FIG. 10 may be implemented in screen transformation 404 in FIG. 4. Specifically, these processes may be implemented in a Java bean in these examples.

The process begins by receiving a datastream from the host (step 1000). The datastream is parsed (step 1002). A presentation space is construction for the host screen (step 1004). Step 1004 converts the data in the host format into an XML format. In these examples, the conversion is made using DTD. In constructing the presentation space, the screen layout described by the datastream is used to create an in-memory image for all the current fields contained in the screen including their characters and attributes.

Then, the presentation space is converted into an XML format (step 1006). The XML format is then handed over to the programs waiting, such as the XSL transformation process. Listeners for these programs are notified about the new host data (step 1008). The process then waits for user input (step 1010). The process returns to step 1010 until user input is received.

When user input is received, the corresponding input field of the host screen is identified (step 1012). A new value for the host input field is set using the user input (step 1014). The user input and the function key are then sent to the host application (step 1016) with the process returning to step 1000 thereafter. In step 1006, the data sent to the host application is now in a format used by the host application.

An input/output mapping mechanism is employed in the present invention to present the host terminal in HTML such that user input can be converted back into original host screen and sent back to the host. The HTML input field is used to provide user input for host application and it contains information about the actually host input field. Also, a hidden field in the HTML terminal emulator is present to carry the cursor position and the function key input from the user.

Figure 11:
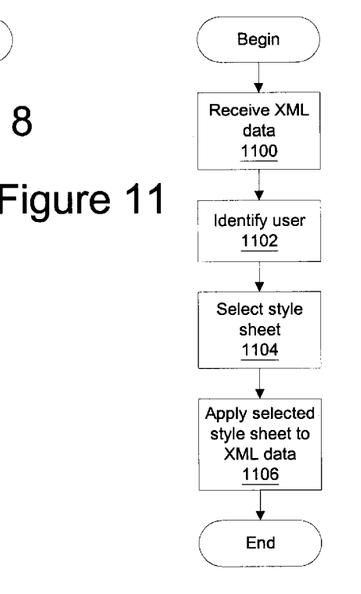
FIG. 11 is a flowchart of a process for transforming XML data into an HTML document in accordance with a preferred embodiment of the present invention.

Turning now to FIG. 11, a flowchart of a process for transforming XML data into an HTML document is depicted in accordance with a preferred embodiment of the present invention. The process begins by receiving the XML data (step 1100). A user is identified (step 1102). A stylesheet is selected for the identified user (step 1104). XSL stylesheets may be selected or changed at run time by manipulating the stylesheet name HIDDEN type input. Macro technology, such as those used by the IBM Host On-Demand (HOD) and Host Publisher products, also may be used to automatically skip host screens and dynamically switch XSL stylesheet. A macro is a prerecorded script that will automatically navigate a host application to a predefined state. This is provided by yet another hidden input type for a prerecorded Host Access macro name which will make the servlet play the macro first before applying the next stylesheet.

The selected stylesheet is applied to the XML data (step 1106) with the process terminating thereafter. In this manner, host terminal emulation customization is easy to perform using the present invention.

Thus, the present invention overcomes problems associated with applications having "green screen" display systems and their use on a network, such as the Internet in which such displays are difficult to support. The mechanism of the present invention avoids having to generate applets for particular applications or having to create an HTML document for each screen. The present invention provides these advantages through transforming host data into a common XML format and using an XSL stylesheet to provide an emulation interface through HTML documents. Further, the stylesheet provides a mechanism to provide a customizable emulation interface without requiring modification of the logic for emulating screens for the emulation interface. The interface may be customized to meet the needs of specific users through the application of different stylesheets to the same common XML format generated from the host data. In this way, the interface is changed by replacing a stylesheet without requiring modification of the logic for the emulation of the screens. In this way, different displays may be provided to different users from the same host application using the same host data from the host application.

Another advantage provided by the present invention is that the user only needs a browser to access a host application using the present invention. Further, changes to displays are easily made through modifications to an XSL stylesheet.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although XML and HTML are used in the explanations of the present inventions, other document languages may be used.

Although the depicted examples illustrate the use of DTD in generating XML data from data in a host format, other mechanisms may be used to provide this transformation or conversion of data. For example, XML schema provides a definition of the content used in an XML document. The XML schema is a superset of DTD, which is the standard SGML schema.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing access to an application, the method comprising:

transforming data from the application having a host format into a first markup language format to form a markup language data;

applying a stylesheet to the markup language data to generate a markup language document;

presenting the markup language document;

receiving input to the markup language document, wherein the input uses the first markup language format;

transforming the input from the first markup language format into the host format to form a host format data; and sending the host format data to the application.

2. The method of claim 1, wherein the first markup language format is an extensible markup language.

3. The method of claim 1, wherein the stylesheet is an extensible stylesheet language stylesheet.

4. The method of claim 1, wherein the markup language document is a hypertext markup language document.

5. The method of claim 1, wherein the step of presenting the markup language document comprises:

sending the markup language document to a client of the data processing system.

6. The method of claim 1, wherein the markup language document is presented in a browser in the client.

7. The method of claim 1, wherein the stylesheet is used to customize an emulation interface without requiring modification of logic to emulate screens for the emulation interface.

8. A method in a data processing system for providing access to an application, the method comprising:
receiving display information from the application in a host format;
converting the display information into an extensible markup language format to form extensible markup language data;
applying a stylesheet to the extensible markup language data to generate a markup language document for display;
sending the markup language document to a client;
receiving input generated from user interaction with the markup language document sent to the client, wherein the input is in a markup language format;
converting the input from the markup language format into the host format to form a converted input; and
sending the converted input to the application.

9. The method of claim 8, wherein the display information is converted into the extensible markup language format using a document type definition.

10. The method of claim 8, wherein the markup language document is a hypertext markup language document.

11. The method of claim 8, wherein the stylesheet is used to customize an emulation interface without requiring modification of logic to emulate screens for the emulation interface.

12. A data processing system comprising:
a bus;
a network adapter, wherein the network adapter is used to communicate with a network;
a memory connected to the bus, wherein the memory includes instructions for processing a data stream from a host application; and
a processor unit, wherein the processor unit executes the instructions to transform the data stream from the host application having a host format into a first markup language format to form a markup language data, apply a stylesheet to the markup language data to generate a markup language document, send the markup language document to a client, and wherein the processor unit executes the instructions to transform input received from the client based on user interaction with the markup language document from a markup language format into the host format to form a host format data and send the host format data to the host application.

13. The data processing system of claim 12, wherein the host application is located in the memory.

14. The data processing system of claim 12, wherein the host application is located on another data processing system and wherein the data stream is received from the host application over the network adapter.

15. The data processing system of claim 12, wherein the first markup language format is extensible markup language.

16. The data processing system of claim 12, wherein the stylesheet is an extensible stylesheet language stylesheet.

17. The data processing system of claim 12, wherein the markup language document is a hypertext markup language document.

18. The data processing system of claim 12, wherein the processor unit includes at least one processor.

19. The data processing system of claim 12, wherein the stylesheet is used to customize an emulation interface without requiring modification of logic to emulate screens for the emulation interface.

20. A data processing system for providing access to an application, the data processing system comprising:
transforming means for transforming data from the application having a host format into a first markup language format to form a markup language data;
applying means for applying a stylesheet to the markup language data to generate a markup language document;
presenting means for presenting the markup language document;
receiving means for receiving input to the markup language document, wherein the input uses the first markup language format;
transforming means for transforming the input from the first markup language format into the host format to form a host format data; and
sending means for sending the host format data to the host application.

21. The data processing system of claim 20, wherein the first markup language format is an extensible markup language.

22. The data processing system of claim 20, wherein the stylesheet is an extensible stylesheet language stylesheet.

23. The data processing system of claim 20, wherein the markup language document is a hypertext markup language document.

24. The data processing system of claim 20, wherein the presenting means for presenting the markup language document comprises:
sending means for sending the markup language document to a client of the data processing system.

25. The data processing system of claim 20, wherein the markup language document is presented in a browser in the client.

26. A data processing system for providing access to an application, the data processing system comprising:
receiving means for receiving display information from the application in a host format;
converting means for converting the display information into an extensible markup language format to form extensible markup language data;
applying means for applying a stylesheet to the extensible markup language data to generate a markup language document for display;
sending means for sending the hypertext markup language document to a client;
receiving means for receiving input generated from user interaction with the markup language document sent to the client, wherein the input is in a markup language format;
converting means for converting the input from the markup language format into the host format to form a converted input; and
sending means for sending the converted input to the application.

27. The data processing system of claim 26, wherein the display information is converted into the extensible markup language format using a document type definition.

28. The data processing system of claim 26, wherein the markup language document is a hypertext markup language document.

29. The data processing system of claim 26, wherein the stylesheet is used to customize an emulation interface without requiring modification of logic to emulate screens for the emulation interface.

30. A computer program product in a computer readable medium for providing access to an application, the computer program product comprising:

first instructions for transforming data from the application having a host format into a first markup language format to form a markup language data;

second instructions for applying a stylesheet to the markup language data to generate a markup language document;

third instructions for presenting the markup language document;

fourth instructions for receiving input to the markup language document, wherein the input uses the first markup language format;

fifth instructions for transforming the input from the markup language format into the host format to form a host format data; and sixth instructions for sending the host format data to the application.

31. A computer program product in a computer readable medium for providing access to an application, the computer program product comprising:

first instructions for receiving display information from the application in a host format;

second instructions for converting the display information into an extensible markup language format to form extensible markup language data;

third instructions for applying a stylesheet to the extensible markup language data to generate a markup language document for display;

fourth sending the markup language document to a client;

fifth instructions for receiving input generated from user interaction with the markup language document sent to the client, wherein the input is in a markup language formats;

sixth instructions for converting the input from the markup language format into the host format to form a converted input; and seventh instructions for sending the converted input to the application.

\* \* \* \* \*

UNITED STATES PATENT AND TRADEMARK OFFICE
CERTIFICATE OF CORRECTION

PATENT NO. : 6,757,869 B1
APPLICATION NO. : 09/527901
DATED : June 29, 2004
INVENTOR(S) : Li et al.

It is certified that error appears in the above-identified patent and that said Letters Patent is hereby corrected as shown below:

Col. 14, line 12: after "fourth" insert --instructions for--.

Col. 14, line 16: delete "formats" and insert --format--.

Signed and Sealed this

Twenty-seventh Day of March, 2007

JON W. DUDAS
*Director of the United States Patent and Trademark Office*